(12) United States Patent
Yamaguchi et al.

(10) Patent No.: US 8,011,488 B2
(45) Date of Patent: Sep. 6, 2011

(54) ROTATING COIL TYPE ELECTROMAGNETIC CLUTCH

(75) Inventors: Takashi Yamaguchi, Gunma (JP); Masao Imamura, Gunma (JP); Satoshi Hayashi, Gunma (JP); Toshihiko Ishida, Aichi (JP); Tsutomu Takeuchi, Aichi (JP)

(73) Assignees: Ogura Clutch Co., Ltd., Gunma (JP); Aisin Seiki Kabushiki Kaisha, Aichi (JP)

( * ) Notice: Subject to any disclaimer, the term of this patent is extended or adjusted under 35 U.S.C. 154(b) by 0 days.

(21) Appl. No.: 13/054,936

(22) PCT Filed: Sep. 1, 2009

(86) PCT No.: PCT/JP2009/065237
§ 371 (c)(1),
(2), (4) Date: Feb. 11, 2011

(87) PCT Pub. No.: WO2010/024443
PCT Pub. Date: Mar. 4, 2010

(65) Prior Publication Data
US 2011/0139569 A1 Jun. 16, 2011

(30) Foreign Application Priority Data
Sep. 1, 2008 (JP) ................................. 2008-223326

(51) Int. Cl.
*F16D 27/06* (2006.01)
(52) U.S. Cl. .................... 192/84.951; 310/248
(58) Field of Classification Search .............. 192/84.95, 192/84.951
See application file for complete search history.

(56) References Cited

U.S. PATENT DOCUMENTS

| 6,012,563 | A | * | 1/2000 | Aoki et al. ............... 192/84.951 |
| 6,298,967 | B1 | * | 10/2001 | Sakamoto et al. ....... 192/84.951 |
| 2008/0110717 | A1 | | 5/2008 | Toyama et al. |

FOREIGN PATENT DOCUMENTS

| JP | 11-132256 A | * | 5/1999 |
| JP | 2002-315267 A | | 10/2002 |
| JP | 2005-248584 A | | 9/2005 |
| JP | 2007-135367 A | | 5/2007 |
| JP | 2007-139028 A | | 6/2007 |
| WO | WO 2009/063717 A1 | | 5/2009 |
| WO | WO 2010/001753 A1 | | 1/2010 |

\* cited by examiner

*Primary Examiner* — Richard M. Lorence
(74) *Attorney, Agent, or Firm* — Blakely, Sokoloff, Taylor & Zafman

(57) ABSTRACT

Brushes (20, 21) which come into slidable contact with slip rings (23, 24) having power feeding terminals (51, 53) electrically connected to a power feeding side include extending portions (32, 36) extending in the radial direction of a field core (3). These extending portions (32, 36) are bent in a direction away from a coil bobbin (12). The third bent portions (32c, 36c) located at the ends of the extending portions are electrically connected to the terminal portions (10d) of coil terminals. An outer diameter R1 of a mounting recess portion (3a) which stores a power feeding device (5) of the field core (3) is smaller than an inner diameter R2 of the coil bobbin (12). This makes it possible to position the mounting recess portion (3a) at a distance H from the coil bobbin (12) in the field core (3) in the arrow A direction, thereby reducing the size of the rotating coil type electromagnetic clutch (1) in the arrow A-B direction.

5 Claims, 15 Drawing Sheets

ROTATING COIL TYPE ELECTROMAGNETIC CLUTCH

This is a non-provisional application claiming the benefit of International Application Number PCT/JP2009/065237 filed Sep. 1, 2009.

TECHNICAL FIELD

The present invention relates to a rotating coil type electromagnetic clutch including an exciting coil to which power is fed from a power feeding device including a brush and a slip ring with which the brush comes into slidable contact.

BACKGROUND ART

A conventional rotating coil type electromagnetic clutch is disclosed in Japanese Patent Laid-Open No. 2007-135367 (reference 1). The clutch disclosed in reference 1 includes an annular recess groove which opens on the armature side and around which an exciting coil is wound and a field core which opens on the side opposite to the armature and is provided with a mounting recess portion in which a power feeding device is mounted, and on which a rotating shaft is axially mounted. An electrode to which the winding start portion and winding end portion of the exciting coil are connected extends through between the annular recess groove and the mounting recess portion, from the annular recess groove, to face the interior of the mounting recess portion. This electrode is electrically connected to a terminal portion of a brush of the power feeding device. Feeding power from the power feeding device to the exciting coil will rotate the field core frictionally engaging with the armature.

DISCLOSURE OF INVENTION

Problem to be Solved by the Invention

In the above conventional rotating coil type electromagnetic clutch, the terminal portion of the brush is exposed from the outer circumferential portion of the brush holder of the power feeding device, and the electrode facing the interior of the mounting recess portion comes into contact with the exposed terminal portion. Owing to this structure, the outer diameter of the mounting recess portion becomes larger than the inner diameter of the annular recess groove. For this reason, it is impossible to place the mounting recess portion in the space on the inner circumference of the annular recess groove. This makes it impossible to place the annular recess groove and the mounting recess portion so as not to overlap each other when viewed from a direction perpendicular to the axial direction of the rotating shaft. This imposes limitation on a reduction in the size of the field core in the axial direction.

The present invention has been made in consideration of the above problem, and has as its object to reduce the size of the apparatus in the axial direction.

Means of Solution to The Problem

In order to achieve the above object, the present invention comprises an armature which has a frictional surface and is rotated/driven by a driving source, a field core which has a frictional surface facing the frictional surface of the armature and rotates integrally upon making the frictional surfaces frictionally engage with each other, a rotating shaft on which the field core is axially mounted, a brush holder mounted in a mounting recess portion formed in the field core, a coil bobbin which is buried in the field core, around which an exciting coil is wound, and which is formed to have an inner diameter larger than an outer diameter of the mounting recess portion, a coil terminal to which a winding start portion and winding fish end portion of the exciting coil are electrically connected and which protrudes from the coil bobbin in an axial direction of the rotating shaft, a slip ring including a power feeding terminal which feeds power to the exciting coil, a brush which is mounted on the brush holder and electrically comes into slidable contact with the slip ring, an extending portion which is integrally formed on the brush and is formed to extend in a direction opposite to the center of the field core and bend in a direction away from the coil bobbin, and a terminal which is formed on an end portion of the extending portion so as to be oriented in the axial direction of the rotating shaft and electrically is in contact with the coil terminal along the axial direction of the rotating shaft.

EFFECTS OF THE INVENTION

According to the present invention, bending the extending portions of the brushes in a direction away from the coil bobbin can make the outer diameter of the mounting recess portion smaller than the inner diameter of the coil bobbin. Therefore, the mounting recess portion can be placed in the space on the inner circumferential side of the coil bobbin. This makes it possible to place the coil bobbin and the mounting recess portion so as to overlap each other when viewed from a direction perpendicular to the axial direction of the rotating shaft. It is therefore possible to reduce the size of the rotating coil type electromagnetic clutch in the axial direction of the rotating shaft.

BEST MODE FOR CARRYING OUT THE INVENTION

The embodiments of the present invention will be described below with reference to FIGS. 1 to 13.

Figure 1:
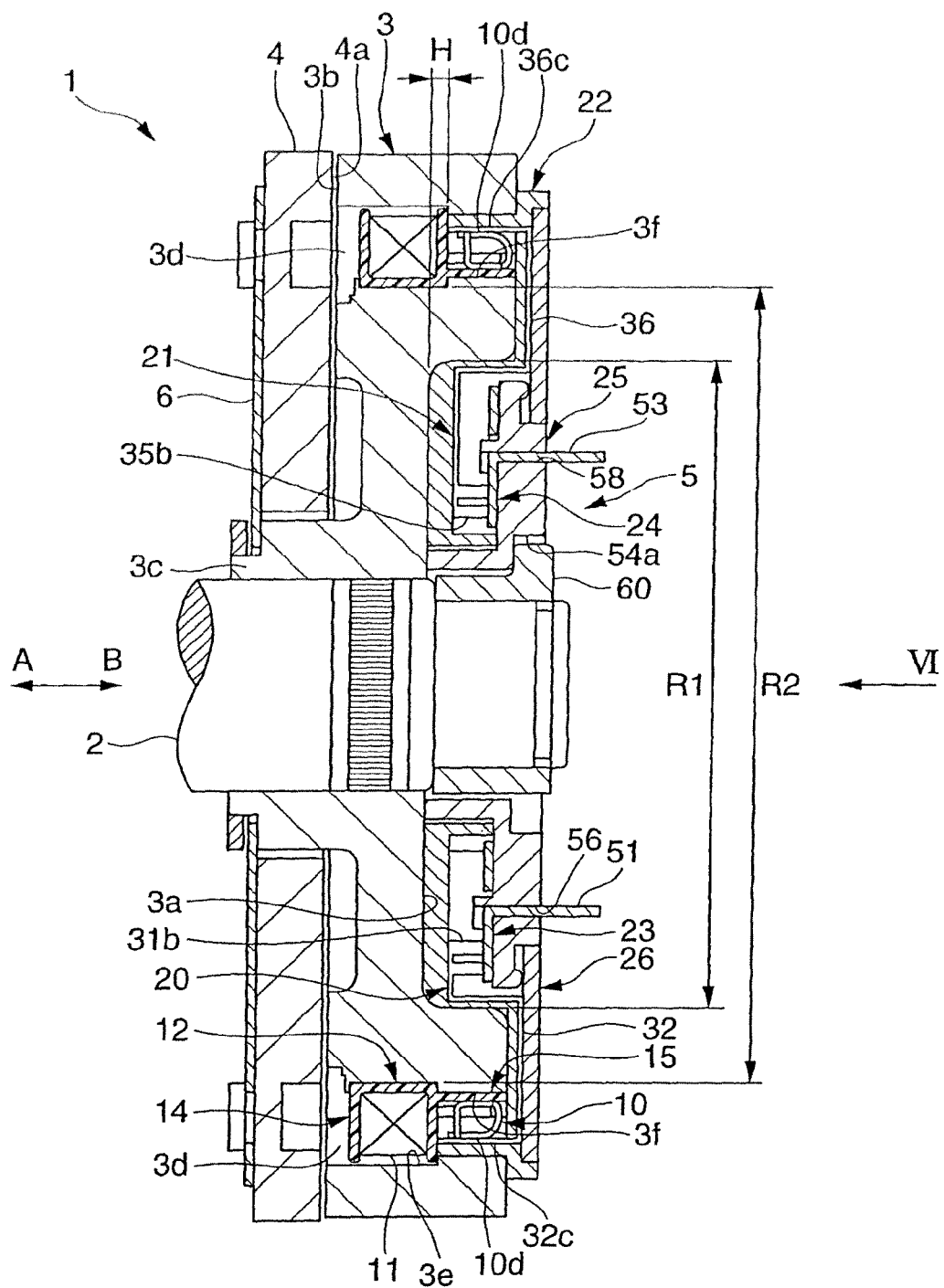
FIG. 1 is a sectional view of a rotating coil type electromagnetic clutch according to the present invention.

A rotating coil type electromagnetic clutch denoted by reference numeral 1 as a whole in FIG. 1 includes a field core 3 having a rotating shaft 2 axially mounted in the central portion, an armature 4 formed by a magnetic member which rotates while interlocking with worm gears (none of which are shown) rotated/driven by a motor, and a power feeding device 5 mounted in a mounting recess portion 3a formed in the end face of the field core 3 in the arrow B direction. The armature 4 is formed in a ring-like shape and supported on a boss portion 3c of the field core 3 through a leaf spring 6 so as to be movable in the axial direction (arrow A-B direction) of the rotating shaft 2 and rotatable, with a frictional surface 4a facing a frictional surface 3b of the field core 3 through a slight gap.

Figure 2A:
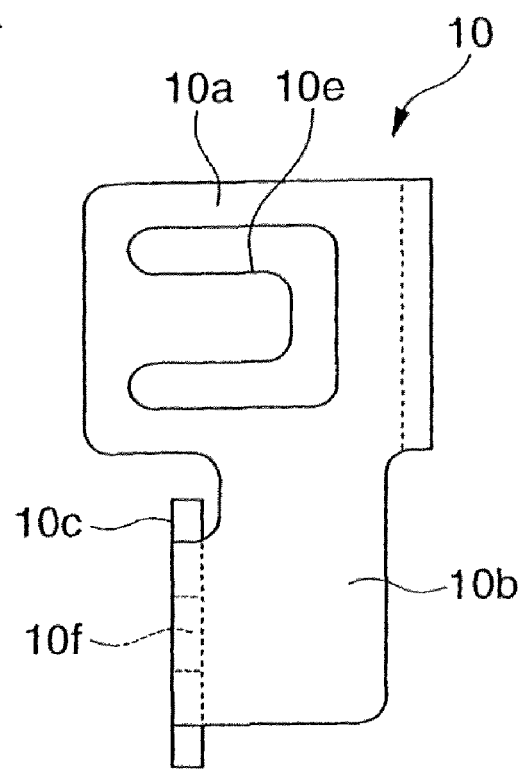
FIG. 2A is a front view of a coil terminal.
Figure 2B:
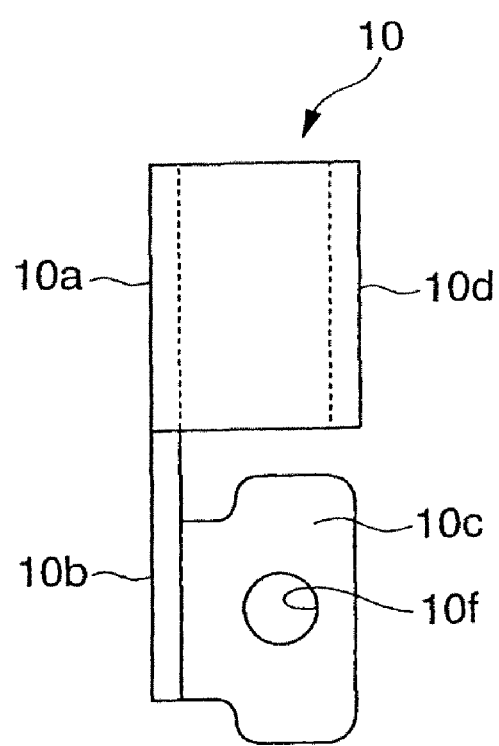
FIG. 2B is a side view of the coil terminal.
Figure 2C:
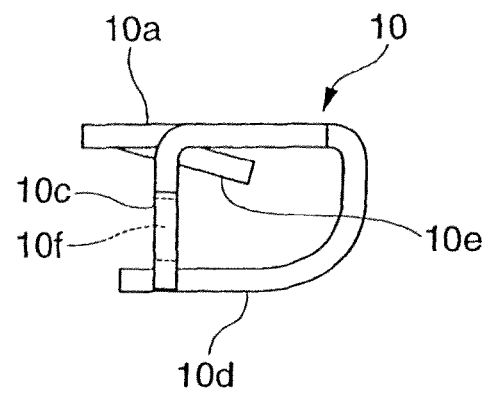
FIG. 2C is a bottom view of the coil terminal.

Coil terminals will be described next with reference to FIG. 2, which are electrically connected to the winding start portion and winding end portion of the exciting coil. Referring to FIG. 2, reference numeral 10 denotes a coil terminal formed by a mounted portion 10a, a coil connection portion 10c formed by being bent at a right angle on a side portion of an extending portion 10b extending from the mounted portion 10a in the plane direction, and a terminal portion 10d folded back from an end portion of the mounted portion 10a on the side opposite to the coil connection portion 10c in a curved shape so as to be parallel to the mounted portion 10a. The mounted portion 10a is provided with an engaging piece 10e which is bent to incline toward the terminal portion 10d side. A connection hole 10f is formed in the coil connection portion 10c. The winding start portion or winding end portion of an exciting coil 11 is inserted in the connection hole 10f and electrically connected to the coil terminal 10 by soldering.

Figure 3A:
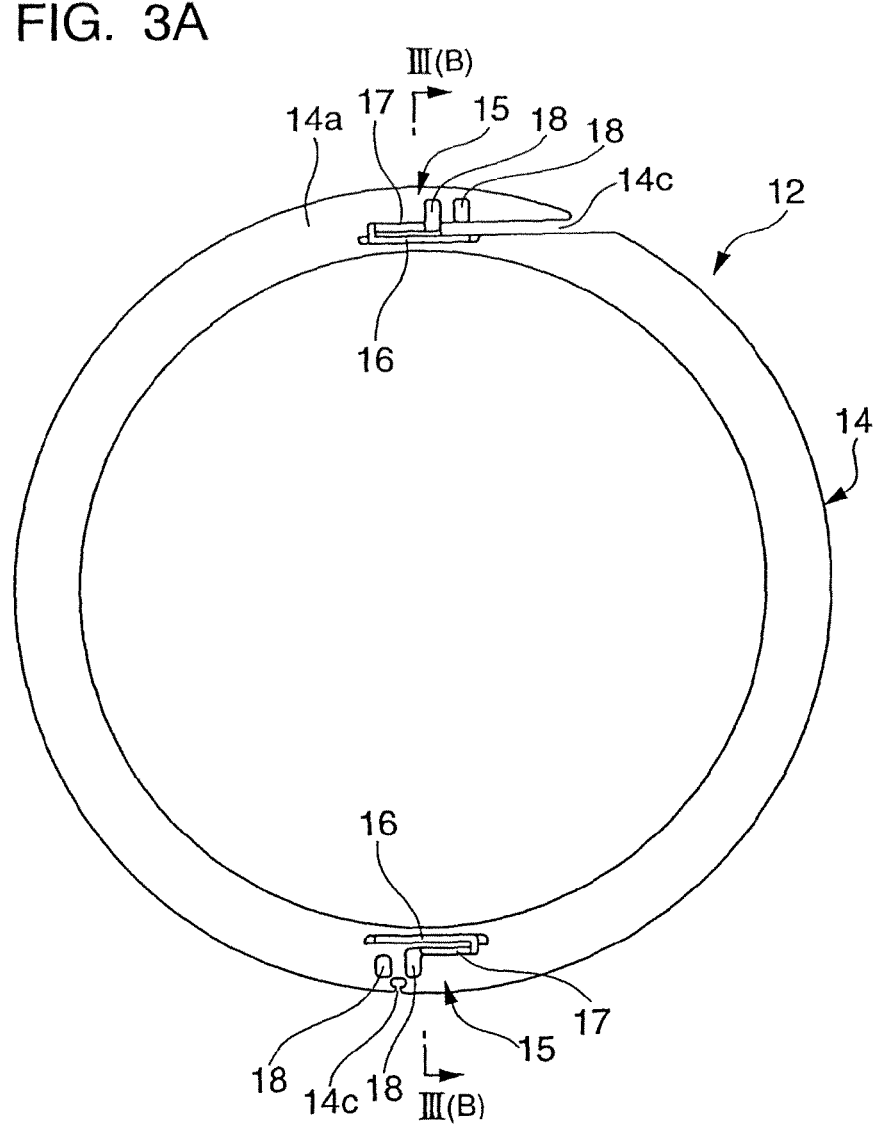
FIG. 3A is a bottom view of a coil bobbin.
Figure 3B:
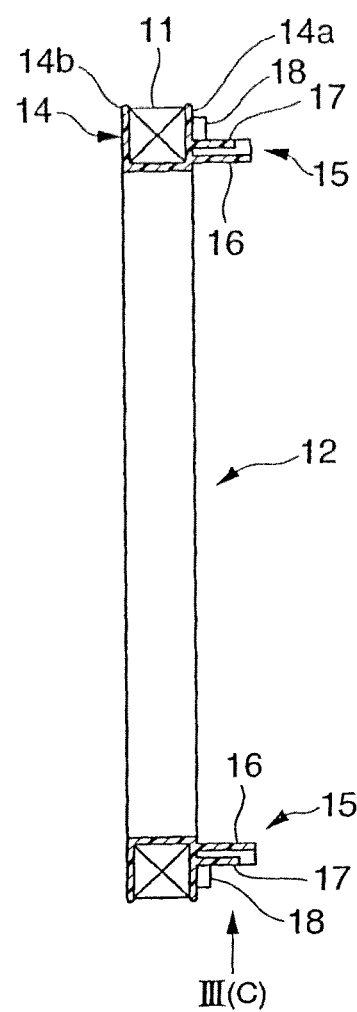
FIG. 3B is a sectional view taken along a line III(B)-III(B) in FIG. 3A.
Figure 3C:
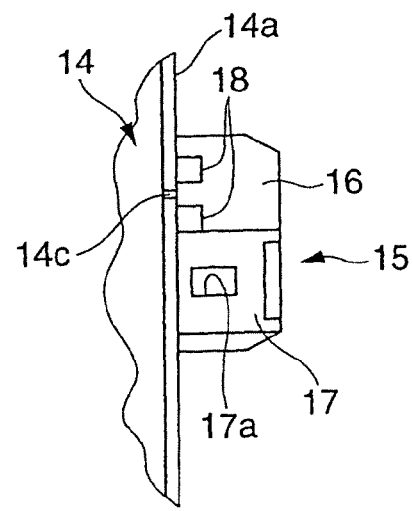
FIG. 3C is a fragmentary view taken along the direction of an arrow III(C) in FIG. 3B.

The coil bobbin will be described next with reference to FIG. 3. Referring to FIG. 3, reference numeral 12 denotes a coil bobbin having a ring-like shape as a whole. A coil winding portion 14 having a U-shaped cross section around which the exciting coil 11 is wound is formed by integrally forming a pair of flanges 14a and 14b. Mounting portions 15 on which the coil terminals 10 are mounted are integrally formed on one flange 14a at positions which are 180° out of phase from each other in the circumferential direction.

Support pieces 16 and 17 are integrally formed upright on each mounting portion 15 so as to extend from one flange 14a and face each other. The gap between the support pieces 16 and 17 is slightly larger than the thickness of the mounted portion 10a of the coil terminal 10. One support piece 17 has an engaging hole 17a with which the engaging piece 10e of the coil terminal 10 engages. Reference numeral 18 denotes mounting portions on which the coil connection portion 10c of the coil terminal 10 is mounted. A through hole 14c through which the winding start portion or winding end portion of the exciting coil 11 extends is formed in the flange 14a of the coil winding portion 14 in correspondence with a position between the mounting portions 18.

Figure 4A:
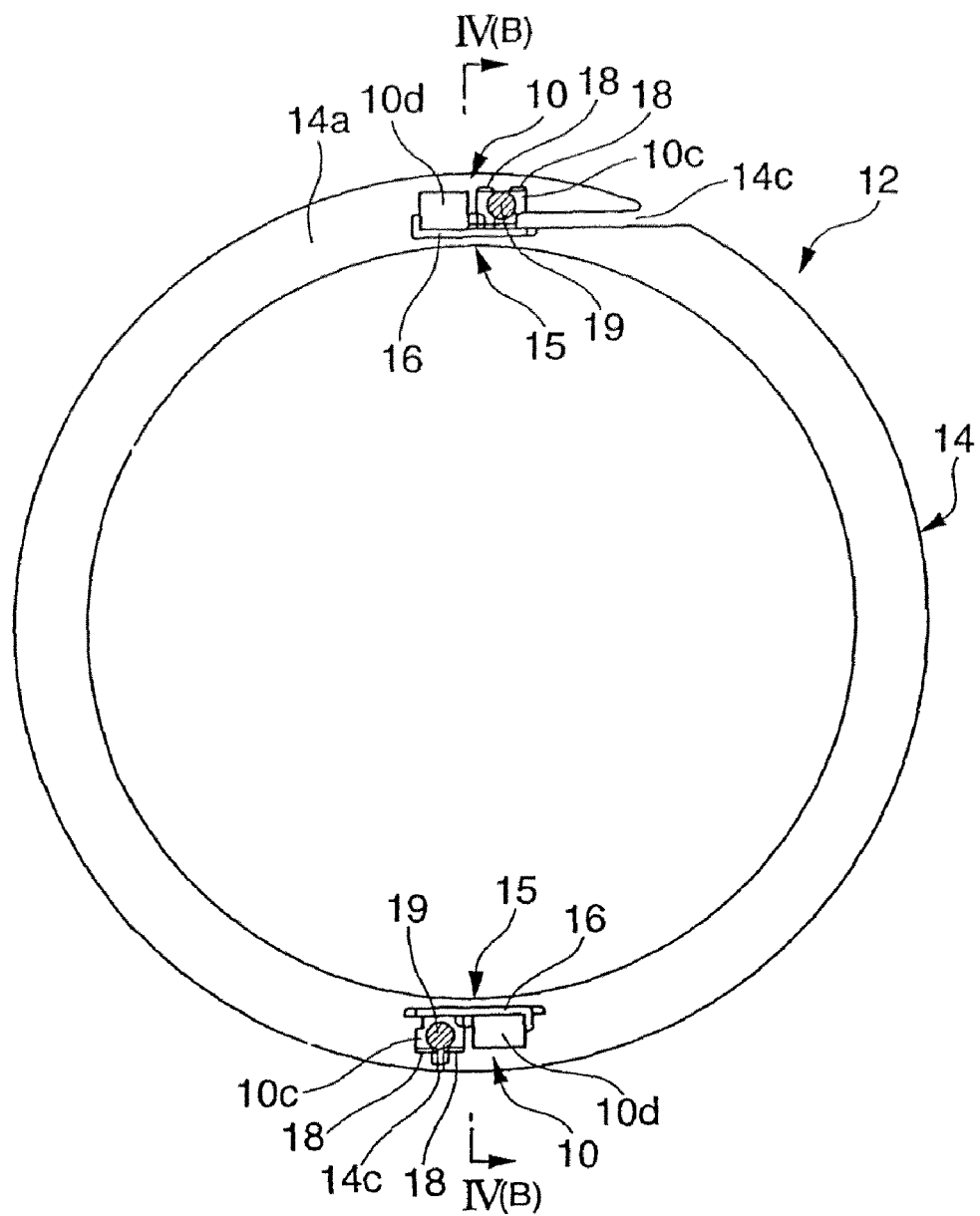
FIG. 4A is a bottom view showing a state in which the coil terminal is mounted on the coil bobbin.
Figure 4B:
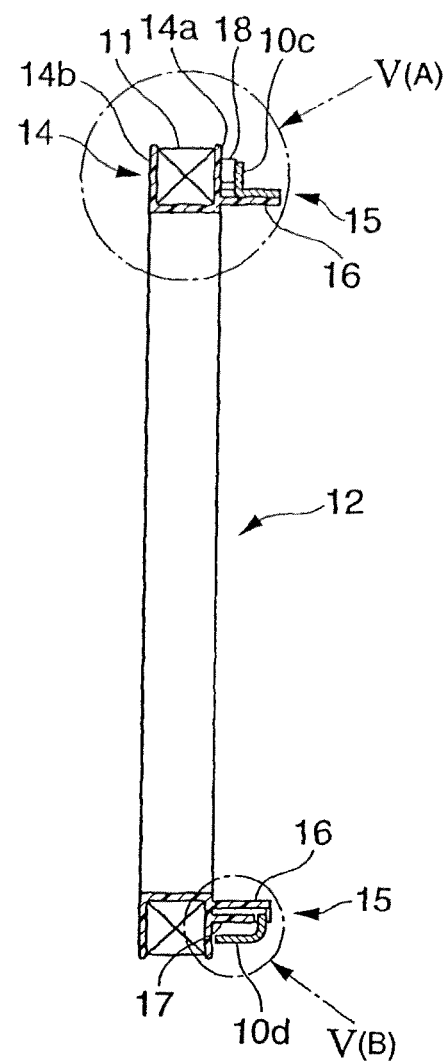
FIG. 4B is a sectional view taken along a line IV(B)-IV(B) in FIG. 4A.
Figure 5A:
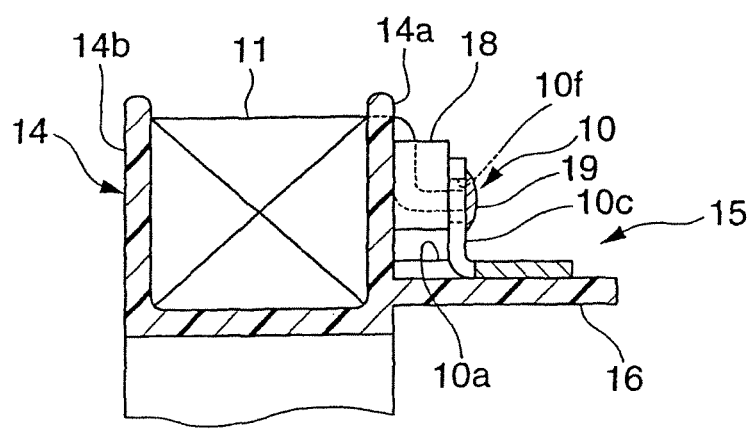
FIG. 5A is an enlarged view of a portion V(A) in FIG. 4B.
Figure 5B:
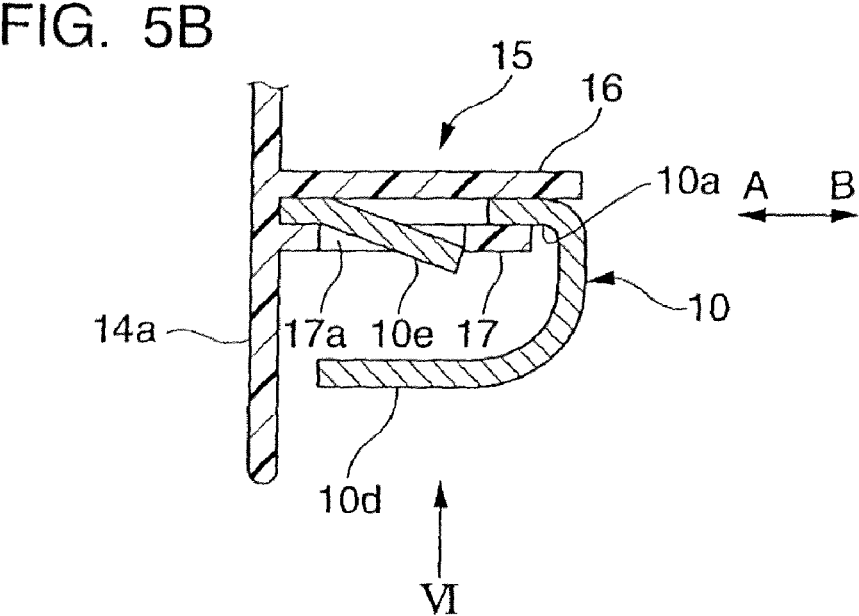
FIG. 5B is an enlarged view of a portion V(B) in FIG. 4l.
Figure 6:
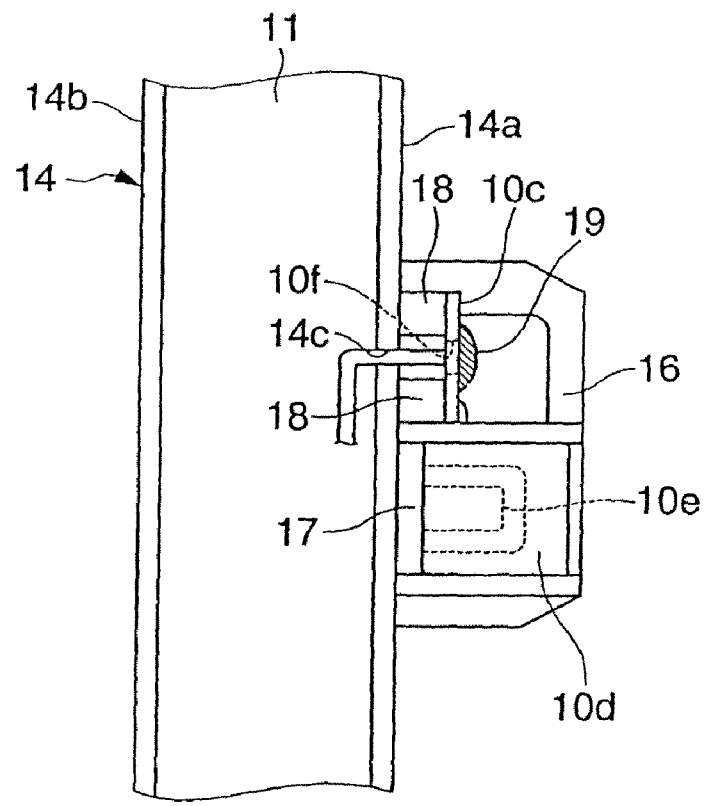
FIG. 6 is a fragmentary view taken along the direction of an arrow VI in FIG. 5B.

In this arrangement, the coil terminals 10 are mounted on the pair of mounting portions 15 of the coil bobbin 12 as shown in FIG. 4 by inserting the mounted portion 10a of each coil terminal 10 into the gap between the support pieces 16 and 17 of the mounting portion 15 in the arrow A direction as shown in FIG. 5B and engaging the engaging piece 10e with the engaging hole 17a of the support piece 17. As shown in FIGS. 5A and 6, the coil connection portion 10c of the coil terminal 10 mounted on the mounting portion 15 in this manner is placed on the mounting portions 18. The winding start portion and winding end portion of the exciting coil 11 extend through the through hole 14c of the coil winding portion 14, pass through between the mounting portions 18, and are inserted into the connection hole 10f of the coil connection portion 10c. The winding start portion and winding end portion are then electrically connected to the coil terminals 10 by soldering 19.

Figure 7A:
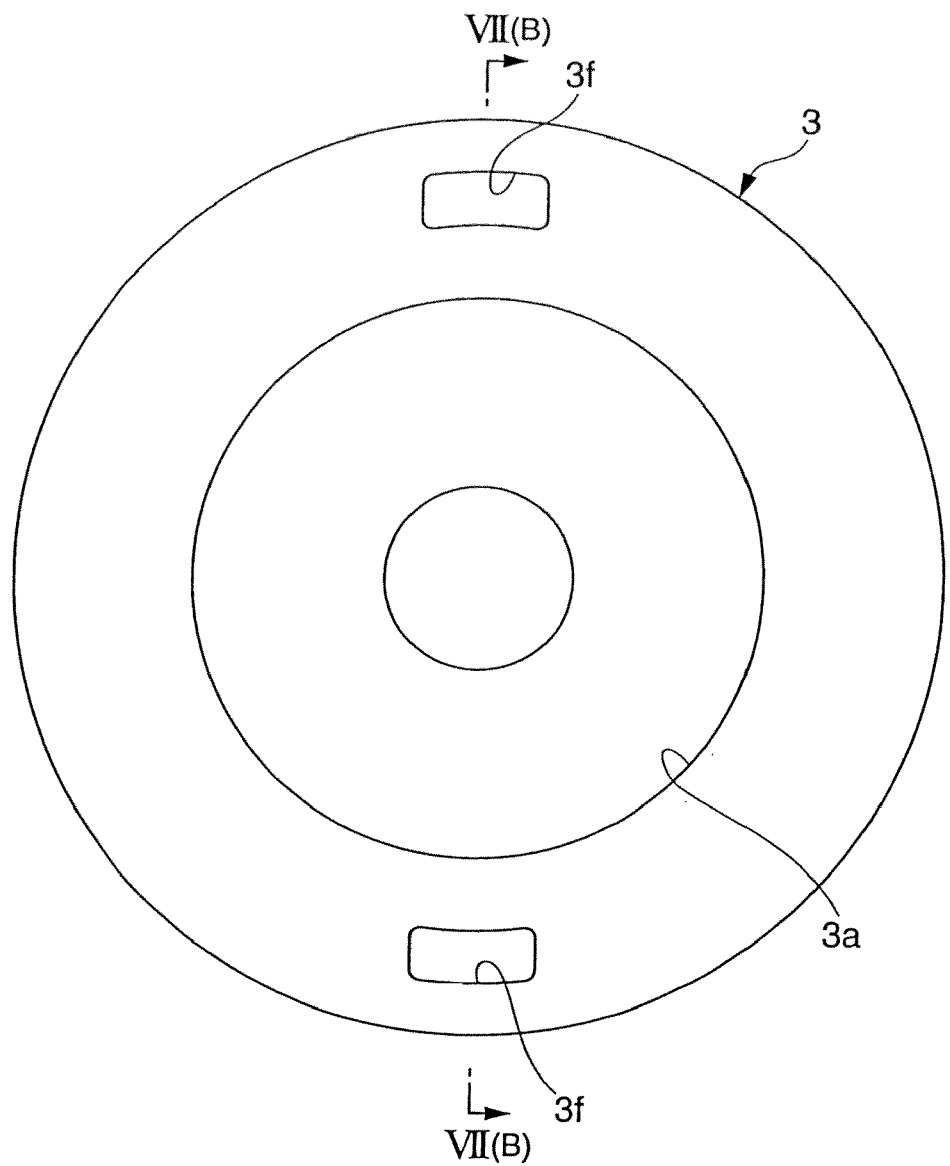
FIG. 7A is a bottom view of afield core.
Figure 7B:
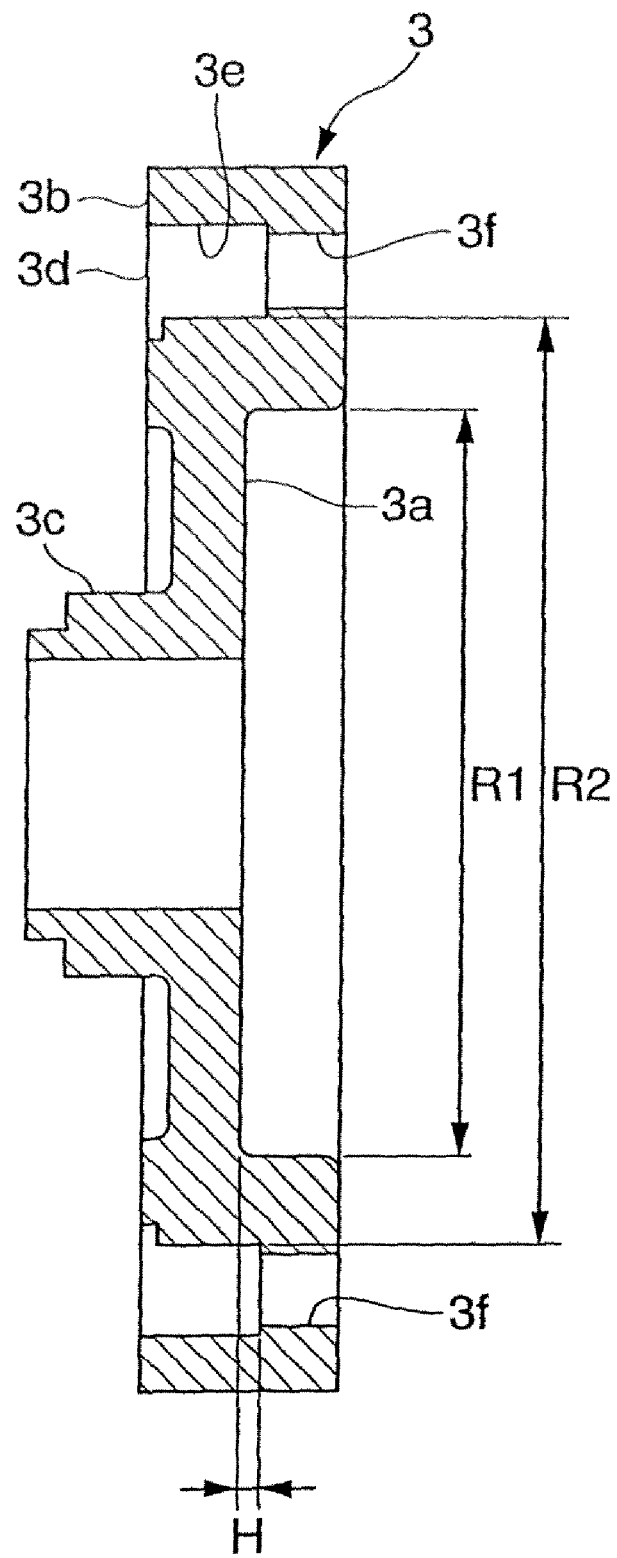
FIG. 7B is a sectional view taken along a line VII(B)-VII(B) in FIG. 7A.

As shown in FIG. 7B, a ring-shaped bobbin storage groove 3e is provided in the field core 3. The bobbin storage groove 3e has an opening portion 3d in the end face on the side opposite to the mounting recess portion 3a. A pair of terminal storage holes 3f which are open on the end face side in which the mounting recess portion 3a of the field core 3 is provided are provided in portions of the bobbin storage groove 3e which are 180° out of phase from each other. An outer diameter R1 of the mounting recess portion 3a formed in the field core 3 is smaller than an inner diameter R2 of the bobbin storage groove 3e. As shown in FIG. 1, therefore, the coil bobbin 12 is stored in the bobbin storage groove 3e from the opening portion 3d of the field core 3 to store the coil terminal 10 mounted on the mounting portion 15 in the terminal storage hole Of so as to make the coil terminal 10 protrude in the arrow B direction.

Figure 8:
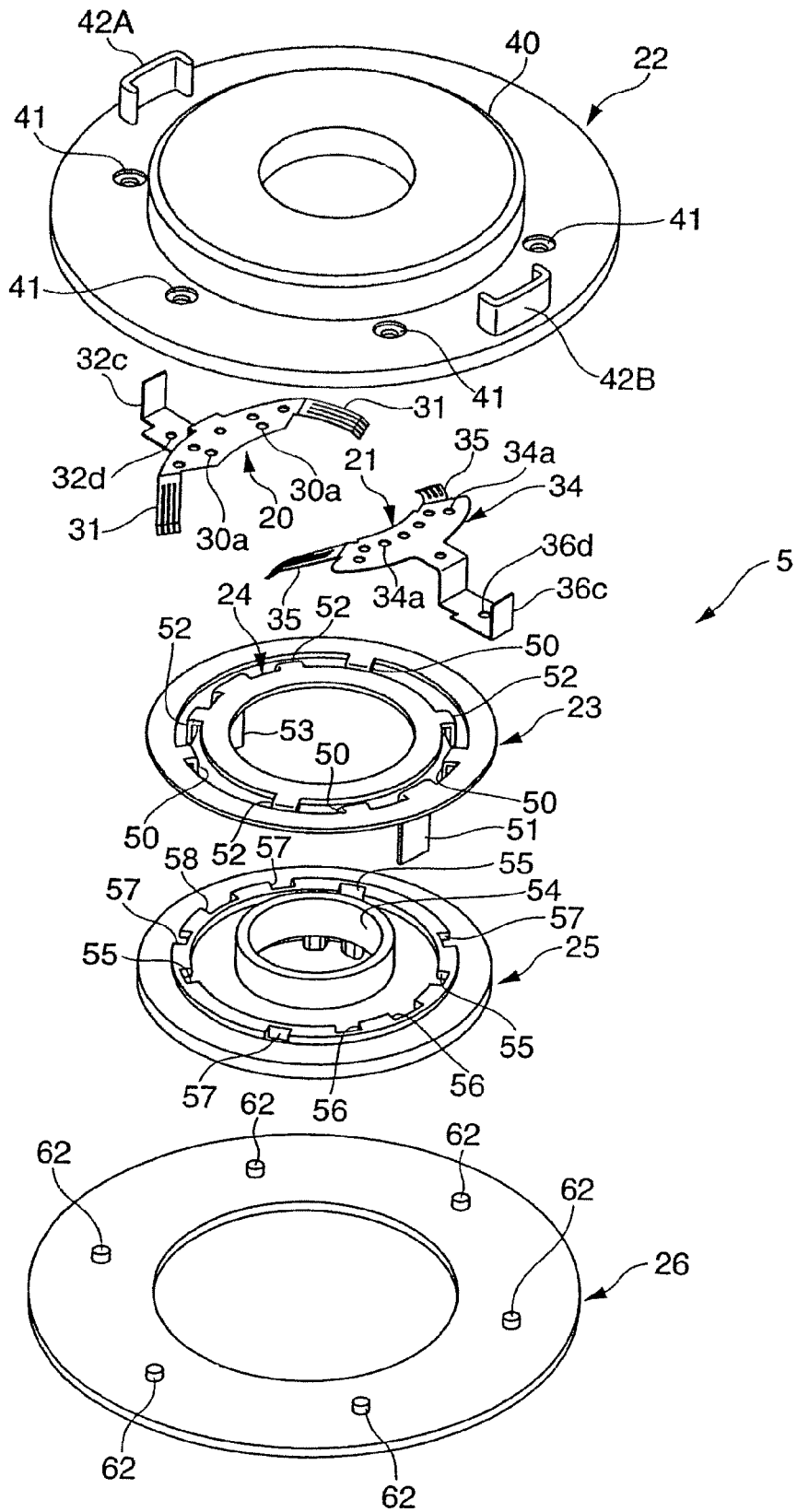
FIG. 8 is an exploded perspective view of the power feeding device of the rotating coil type electromagnetic clutch according to the present invention.
Figure 9:
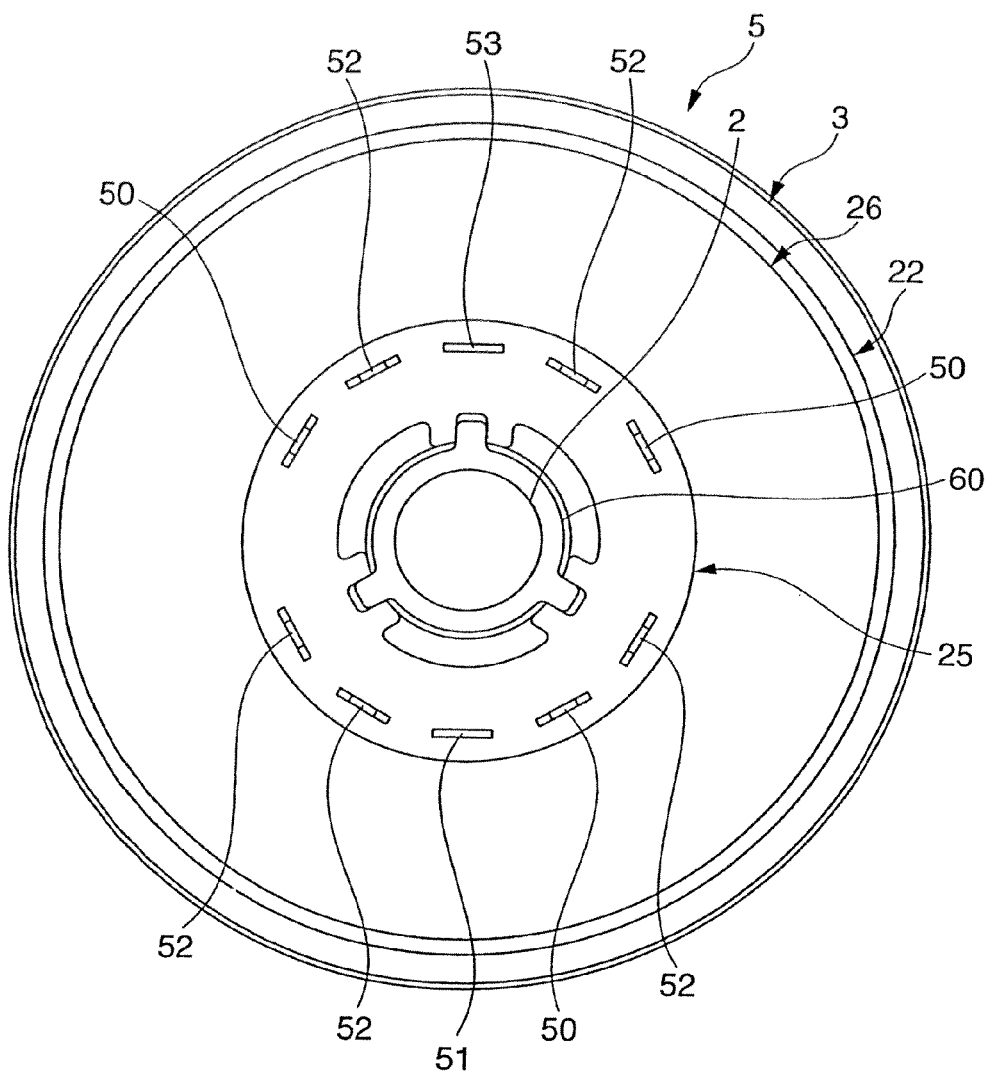
FIG. 9 is a bottom view of the power feeding device of the rotating coil type electromagnetic clutch according to the present invention.

The power feeding device 5 will be described next with reference to FIGS. 8 to 13. As shown in FIG. 8, the power feeding device 5 mainly includes first and second brushes 20 and 21, a brush holder 22 on which the first and second brushes 20 and 21 are mounted, first and second slip rings 23 and 24 which come into slidable contact with the first and second brushes 20 and 21, a ring holder 25 on which the first and second slip rings 23 and 24 are mounted, and a stopper plate 26 fixed to the brush holder 22.

Figure 11A:
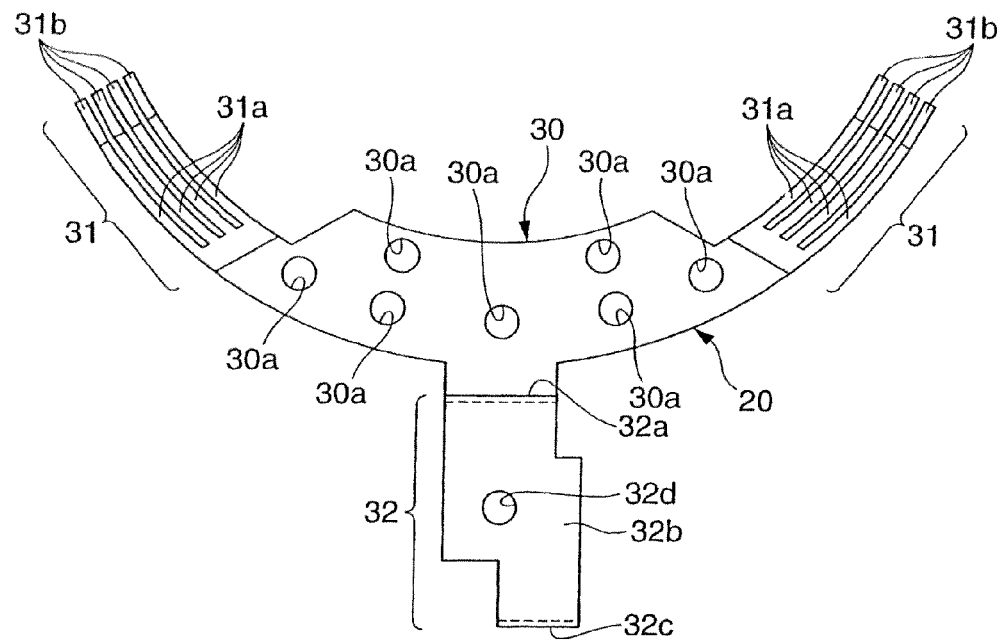
FIG. 11A is a plan view of the first brush.
Figure 11B:
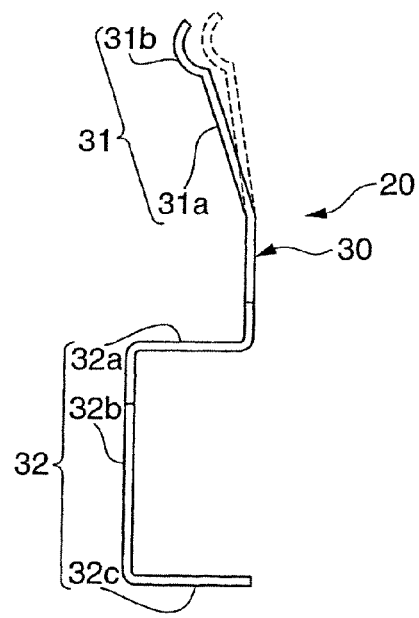
FIG. 11B is a side view of the first brush.

As shown in FIG. 11, the first brush 20 is formed by a basal portion 30 formed in an almost arcuated shape in a plan view, sliding contacts 31 protruding from the two end portions of the basal portion 30 in the circumferential direction, and an extending portion 32 extending from the middle portion of the basal portion 30 in the radial direction. Many first through holes 30a are formed in the basal portion 30. As shown in FIG. 11B, each sliding contact 31 includes a plurality of contact pieces 31a which are bent to slightly tilt from the basal portion 30 in the plane direction and branch toward the distal ends. The distal end portions of the contact pieces 31a are provided with contact portions 31b having arcuated cross sections which come into slidable contact with the first slip ring 23.

As described later, the extending portion 32 extends in a direction opposite to the center (rotating shaft of the field core 3 while the first brush 20 is mounted on the field core 3 through the brush holder 22, and bends in a direction (the arrow B direction in FIG. 1) away from the coil bobbin 12 stored in the field core 3. That is, the extending portion 32 includes a first bent portion 32a bent at a right angle relative to the basal portion 30, a second bent portion 32b bent at a right angle relative to the first bent portion 32a, and a third bent portion 32c bent at a right angle relative to the second bent portion 32b. The second bent portion 32b is bent away from the coil bobbin 12 stored in the field core 3. Therefore, the third bent portion 32c as the end portion of the extending portion 32 is parallel to the arrow A direction, i.e., the axial direction of the rotating shaft 2. The third bent portion 32c forms a terminal electrically connected to the terminal portion 10d of the coil terminal 10. The second bent portion 32b is provided with one second through hole 32d.

Figure 12A:
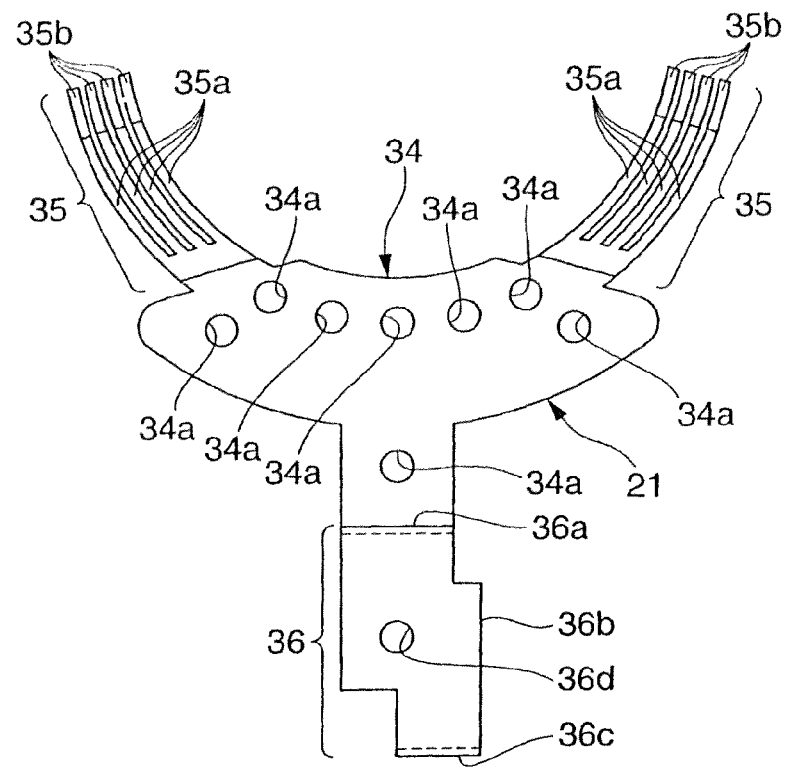
FIG. 12A is a plan view of the second brush.
Figure 12B:
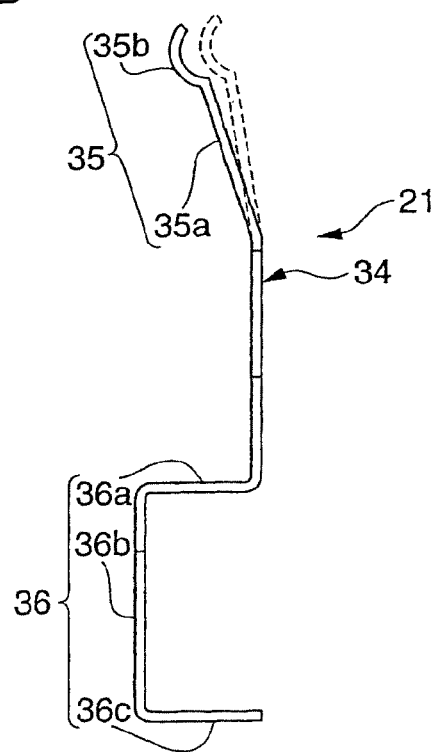
FIG. 12B is a side view of the second brush.

As shown in FIG. 12, the second brush 21 is formed by a basal portion 34 having an arcuated shape in a plan view, sliding contacts 35 protruding from the two end portions of the basal portion 34 in the circumferential direction, and an extending portion 36 extending from the middle portion of the basal portion 34 in the radial direction. Many first through holes 34a are formed in the basal portion 34. As shown in FIG. 12B, each sliding contact 35 includes a plurality of terminal pieces 35a which are bent to slightly tilt from the basal portion 34 in the plane direction and branch toward the distal ends. The distal end portions of the terminal pieces 35a are provided with contact portions 35h having arcuated cross sections which come into slidable contact with the second slip ring 24.

As described above, the first and second slip rings 23 and 24 come into contact with the plurality of contact portions 31b and 35b. This reduces the contact resistance between the first and second slip rings 23 and 24 and the first and second brushes 20 and 21. In addition, the contact portions 31b and 35b are made to branch, which come into slidable contact with the first and second slip rings 23 and 24 of the first and second brushes 20 and 21. Even if, therefore, the first and second slip rings 23 and 24 do not have flat surfaces, the contact portions 31b and 35b elastically deform with respect to the surfaces of the first and second slip rings 23 and 24. This therefore prevents an increase in the contact resistance between the contact portions 31b and 35b and the first and second slip rings 23 and 24.

As described later, the extending portion 36 is bent in a direction (the arrow B direction in FIG. 1) away from the coil bobbin 12 stored in the field core 3 while the second brush 21 is mounted on the field core 3 through the brush holder 22. That is, the extending portion 36 includes a first bent portion 36a bent at a right angle relative to the basal portion 34, a second bent portion 36b bent at a right angle relative to the first bent portion 36a, and a third bent portion 36c functioning as a terminal bent at a right angle relative to the second bent portion 36b. The second bent portion 36b is bent away from the coil bobbin 12 stored in the field core 3. Therefore, the third bent portion 36c as the end portion of the extending portion 36 is parallel to the arrow A direction, i.e., the axial direction of the rotating shaft 2. The third bent portion 36c forms a terminal electrically connected to the terminal portion 10d of the coil terminal 10. The second bent portion 36b is provided with one second through hole 36d.

Figure 10A:
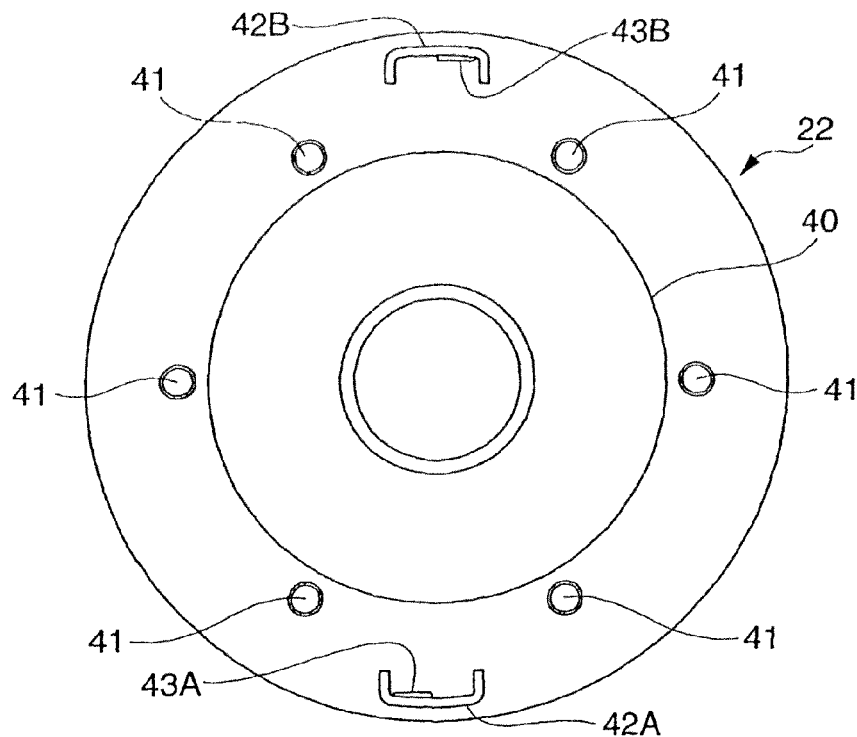
FIG. 10A is a plan view of a brush holder.
Figure 10B:
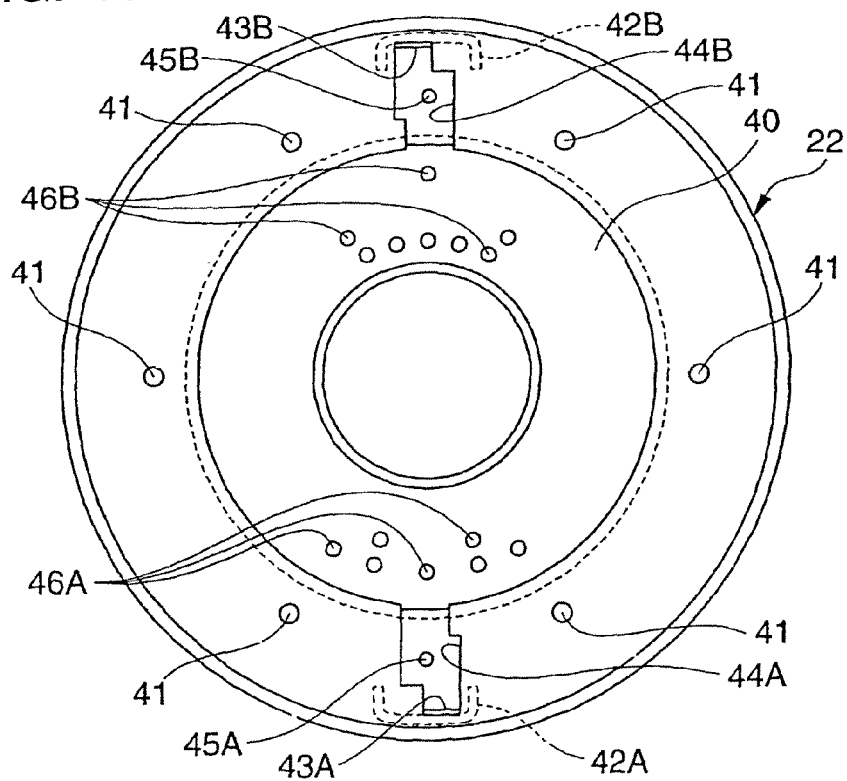
FIG. 10B is a bottom view of the brush holder.

As shown in FIG. 8, a projection portion 40 which has a circular shape in a plan view and is fitted in the mounting recess portion 3a of the field core 3 described above protrudes from the central potion of the brush holder 22. A plurality of through holes 41 are formed around the projection portion 40. Support walls 42A and 42B, each having a U-shaped form in a plan view, are integrally formed upright at portions on the outer periphery of the brush holder 22 which are 180° out of phase so as to face each other. As shown in FIG. 10, through grooves 43A and 43B are formed in the basal portions of the support walls 42A and 42B.

Recess portions 44A and 44B in which the second bent portions 32b and 36b of the first and second brushes 20 and 21 are fitted are formed in the lower surface of the brush holder 22 in correspondence with the support wall 42A and 42B. In the recess portions 44A and 44B, second small projections 45A and 45B protrude, which are fitted in second through holes 32d and 36d of the first and second brushes 20 and 21. First small projections 46A and 46B which are fitted in the first through holes 30a and 34a of the first and second brushes 20 and 21 protrude from the lower surface of the projection portion 40 of the brush holder 22 at positions near the recess portions 44A and 44B.

In this arrangement, when the bent portion 32c of the first brush 20 is made to extend through the through groove 43A from the lower surface side of the brush holder 22, and the second bent portion 32b is fitted in the recess portion 44A, the first through holes 30a are fitted on the first small projections 46A, and the second through holes 32d are fitted on the second small projections 45A. In this state, the first brush 20 is mounted on the brush holder 22 by caulking the first and second small projections 46A and 45A while the third bent portion 32c is in contact opposite to the support wall 42A. In this case, the third bent portion 32c extending through the through groove 43A comes into contact opposite to the support wall 42A of the brush holder 22.

Likewise, when the third bent portion 36c of the second brush 21 is made to extend through the through groove 43B from the lower surface side of the brush holder 22 and the second bent portion 36b is fitted in the recess portion 44B, the first through holes 34a are fitted on the first small projections 46B, and the second through holes 36d are fitted on the second small projections 45B. In this state, the second brush 21 is mounted on the brush holder 22 by caulking the first and second small projections 46B and 45B while the third bent portion 36c is in contact opposite to the support wall 42B. In this case, the third bent portion 36c extending through the through groove 43B comes into contact with the support wall 42B of the brush holder 22

In this manner, the first and second brushes 20 and 21 are mounted on the brush holder 22 by elastically deforming the second small projections 45A and 45B fitted in the second through holes 32d and 36d formed in the second bent portions 32b and 36b of the extending portions 32 and 36 of the first and second brushes 20 and 21. For this reason, even if loads are applied to the first and second brushes 20 and 21 when the contact portions 31b and 35b of the first and second brushes 20 and 21 electrically come into slidable contact with the first and second slip rings 23 and 24, the first and second brushes 20 and 21 do not freely move. This can reduce the electrical contact resistance between the contact portion 31b and 35b and the first and second slip rings 23 and 24.

The brush holder 22 is fixed to the field core 3 by fitting the projection portion 40 in the mounting recess portion 3a while fitting the support walls 42A and 42B of the brush holder 22, on which the first and second brushes 20 and 21 are mounted, in the terminal storage holes 3f of the field core 3 as shown in FIG. 1. In this state, the third bent portions 32c and 36c of the first and second brushes 20 and 21 electrically come into contact with the terminal portions 10d of the coil terminals 10 along the axial direction (the arrow A-B direction) of the rotating shaft 2.

Providing the brush holder 22 with the support walls 42A and 42B fitted in the terminal storage holes 3f of the field core 3 allows the brush holder 22 to be positioned and mounted on the field core 3, thus facilitating mounting operation. In addition, the third bent portions 32c and 36c of the first and second brushes 20 and 21 are clamped between the terminal portions 10d and the support walls 42A and 42B as the terminal portions 10d of the coil terminals 10 are pressed against the support walls 42A and 42B with the elastically restoring force of the terminal portions 10d while the third bent portions 32c and 36c are in contact opposite to the support walls 42A and 42B of the brush holder 22. This makes the third bent portions 32c and 36c come into tight contact with the terminal portions 10d, and hence can reduce the electrical contact resistance between them.

In this case, the extending portions 32 and 36 of the first and second brushes 20 and 21 are bent to separate the second bent portions 32b and 36b from the coil bobbin 12. As described above, the outer diameter R1 of the mounting recess portion 3a of the field core 3 is smaller than the inner diameter R2 of the coil bobbin 12. This makes it possible to position the mounting recess portion 3a at a distance H from the coil winding portion 14 of the coil bobbin 12 in the field core 3 in the arrow A direction. This can reduce the size of the rotating coil type electromagnetic clutch 1 in the arrow A-B direction.

As shown in FIG. 8, the first slip ring 23 has a ring-like shape and is provided with a plurality of mounting bent pieces 50 bent downward from the inner periphery and one power feeding terminal 51. Each mounting bent piece 50 has a bifurcated distal end portion. As shown in FIG. 8, the second slip ring 24 has a ring-like shape smaller in diameter than the first slip ring 23, and is provided with a plurality of mounting bent pieces 52 bent downward from the outer periphery and one power feeding terminal 53. Each mounting bent piece 52 has a bifurcated distal end portion.

Figure 13A:
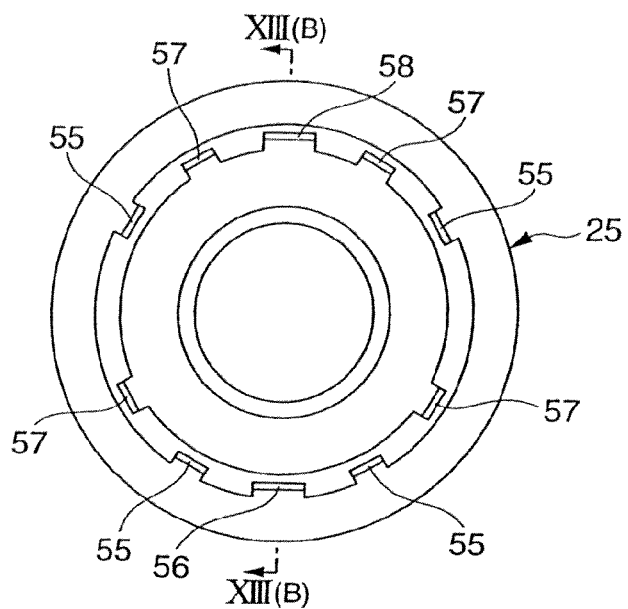
FIG. 13A is a plan view of a ring holder.
Figure 13B:
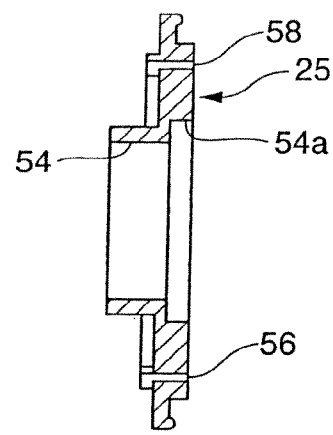
FIG. 13B is a sectional view taken along a line XIII(B)-XIII(B) in FIG. 13A.
Figure 13C:
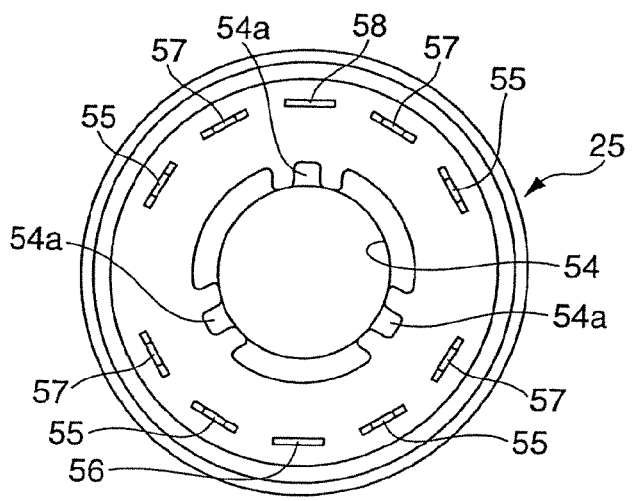
FIG. 13C is a bottom view of the ring holder.

As shown in FIG. 13C, the periphery of a through hole 54 provided in the central portion of the ring holder 25 has three notches 54a at equal angular intervals in the circumferential direction to fix a bearing 60 (see FIG. 1) which rotatably supports the rotating shaft 2. In addition, the peripheral portion of the ring holder 25 has through holes 56 and 58 at positions which are 180° out of phase from each other in the circumferential direction. The power feeding terminals 51 and 53 of the first and second slip rings 23 and 24 extend through the through holes 56 and 58. A plurality of fitting holes 55 and 57 are provided between the through holes 56 and 58. The mounting bent pieces 50 and 52 of the first and second slip rings 23 and 24 are fitted in the fitting holes 55 and 57.

In this arrangement, fitting the mounting bent pieces 50 of the first slip ring 23 in the fitting holes 55 of the ring holder 25 while elastically deforming the bifurcated distal end portions will mount the first slip ring 23 on the ring holder 25 so as to make the power feeding terminal 51 extend through the through hole 56, as shown in FIG. 1. Likewise, fitting the mounting bent pieces 52 of the second slip ring 24 in the fitting holes 57 of the ring holder 25 while elastically deforming the bifurcated distal end portions will mount the second slip ring 24 on the ring holder 25 so as to make the power feeding terminal 53 extend through the through hole 58, as shown in FIG. 1. The ring holder 25 is fixed to fixing members (none of which are shown) such that the power feeding terminals 51 and 53 are fitted in the connectors on the power feeding side and electrically connected to them.

As shown in FIG. 8, the stopper plate 26 has a ring-like shape, and a plurality of small projections 62 are integrally formed upright on the stopper plate 26 at equal angular intervals in the circumferential direction. Fitting the small projections 62 in the through holes 41 of the brush holder 22 will mount the stopper plate 26 on the brush holder 22, thereby assembling the rotating coil type electromagnetic clutch 1, as shown in FIG. 1. In the rotating coil type electromagnetic clutch 1 assembled in this manner, when power is fed to the exciting coil 11 through the first and second slip rings 23 and 24 and the first and second brushes 20 and 21 which are electrically in slidable contact with the first and second slip rings 23 and 24, the armature 4 is attracted to the exciting coil 11 due to its magnetic flux so as to make the frictional surface 4a of the armature 4 frictionally engage with the frictional surface 3b of the field core 3. As a consequence, the armature 4 and the field core 3, which rotate while interlocking with worm gears (none of which are shown) rotated/driven by the motor, integrally rotate. This rotation is then transmitted to the rotating shaft 2.

The invention claimed is:

1. A rotating coil type electromagnetic clutch comprising:
   an armature which has a frictional surface and is rotated/driven by a driving source;
   a field core which has a frictional surface facing the frictional surface of said armature and rotates integrally upon making the frictional surfaces frictionally engage with each other;
   a rotating shaft on which said field core is axially mounted;
   a brush holder mounted in a mounting recess portion formed in said field core;
   a coil bobbin which is buried in said field core, around which an exciting coil is wound, and which is formed to have an inner diameter larger than an outer diameter of the mounting recess portion;
   coil terminals to which a winding start portion and winding fish end portion of the exciting coil are electrically connected and which protrude from said coil bobbin in an axial direction of said rotating shaft;
   slip rings including power feeding terminals which feed power to the exciting coil;
   brushes which are mounted on said brush holder and electrically come into slidable contact with said slip rings;
   extending portions which are integrally formed on said brushes and are formed to extend in a direction opposite to the center of said field core and bend in a direction away from said coil bobbin; and
   brush terminals which are formed on end portions of said extending portions so as to be oriented in the axial direction of said rotating shaft and electrically are in contact with said coil terminals along the axial direction of said rotating shaft.

2. A rotating coil type electromagnetic clutch according to claim 1, further comprising:
   through holes formed in said extending portions of said brushes; and
   projections which protrude from said brush holder, are fitted in said through holes, and are elastically deformed to mount said brushes on said brush holder.

3. A rotating coil type electromagnetic clutch according to claim 1, further comprising a plurality of branched contact portions on portions of said brushes which come into slidable contact with said slip rings.

4. A rotating coil type electromagnetic clutch according to claim 1, further comprising:
   a pair of terminal storage holes which are formed in said field core and store said coil terminals;
   a pair of support walls which are formed upright on said brush holder and respectively fitted in the pair of terminal storage holes.

5. The rotating coil type electromagnetic clutch according to claim 4, further comprising through grooves in portions of said brush holder which correspond to said support walls,
   wherein said brush terminals extend through said through grooves and are in contact with said support walls, and said coil terminals and said support walls clamp the brush terminals.

* * * * *